United States Patent
Wang et al.

(10) Patent No.: US 10,036,903 B2
(45) Date of Patent: Jul. 31, 2018

(54) PHOTOELASTIC MODULATOR HAVING SYMMETRIC STRUCTURE AND FORTY-FIVE DEGREE DOUBLE-DRIVE PHOTOELASTIC MODULATOR

(71) Applicant: North University of China, Shanxi (CN)

(72) Inventors: Zhibin Wang, Shanxi (CN); Kewu Li, Shanxi (CN); Rui Zhang, Shanxi (CN); Youhua Chen, Shanxi (CN); Yuanyuan Chen, Shanxi (CN); Jinhua Li, Shanxi (CN); Xinglai Liu, Shanxi (CN); Changqing Yang, Shanxi (CN)

(73) Assignee: North University of China, Shanxi (CN)

( * ) Notice: Subject to any disclaimer, the term of this patent is extended or adjusted under 35 U.S.C. 154(b) by 144 days.

(21) Appl. No.: 15/149,795

(22) Filed: May 9, 2016

(65) Prior Publication Data
US 2017/0322432 A1    Nov. 9, 2017

(51) Int. Cl.
G02F 1/01    (2006.01)
G02F 1/00    (2006.01)

(52) U.S. Cl.
CPC .......... G02F 1/0131 (2013.01); G02F 1/0072 (2013.01); G02F 1/0136 (2013.01)

(58) Field of Classification Search
CPC .... G02F 1/0131; G02F 1/0136; G02F 1/0072; G02F 1/0128
See application file for complete search history.

(56) References Cited

U.S. PATENT DOCUMENTS

2008/0001055 A1 *  1/2008  Mansfield .............. G02B 7/006
                                                      248/560

* cited by examiner

*Primary Examiner* — Joseph P Martinez
(74) *Attorney, Agent, or Firm* — Dicke, Billig & Czaja, PLLC

(57) ABSTRACT

The present invention relates to a Photoelastic Modulator (PEM), particularly to a novel polarized light modulator structure based on a photoelastic effect. The PEM, which controls driving voltages of two groups of piezoelectric actuators, is able to implement polarized light modulation having a relatively large optical path difference, and polarized light modulator having a fast modulation shaft moving circumferentially, and the PEM operates stably without a moving component. The present invention includes the piezoelectric actuators, a light pass crystal and a driver controller. Two light pass faces of the light pass crystal are parallel regular octagons directly facing each other, and identical rectangles are formed by side faces of the light pass crystal. The piezoelectric actuators are in soft connection with middle positions of the rectangles by connection rubber layers. The width directions of the piezoelectric actuators are consistent with the direction of the light pass thickness of the light pass crystal, and the widths are slightly larger than the light pass thickness. The piezoelectric actuators are connected with electric output ends on the driver controller by electric adapters. This aspect is mainly applied to PEMs.

11 Claims, 2 Drawing Sheets and more particularly to a novel polarized light modulator structure based on a photoelastic effect, so that photoelastic modulation having a relatively large optical path difference and an adjustable optical path difference range, and moreover, rotation of photoelastic modulation axis can be implemented.

PHOTOELASTIC MODULATOR HAVING SYMMETRIC STRUCTURE AND FORTY-FIVE DEGREE DOUBLE-DRIVE PHOTOELASTIC MODULATOR

TECHNICAL FIELD OF THE INVENTION

The present invention relates to a Photoelastic Modulator (PEM), particularly to a novel PEM having a symmetric structure and 45° double-drive Photoelastic Modulator (PEM), and more particularly to a novel polarized light modulator structure based on a photoelastic effect, so that photoelastic modulation having a relatively large optical path difference and an adjustable optical path difference range, and moreover, rotation of photoelastic modulation axis can be implemented.

BACKGROUND OF THE INVENTION

A PEM is an artificial birefringence optical electro-mechanical device designed based on a photoelastic effect. Piezoelectric actuators and a light pass crystal operate in a fundamental frequency resonance state. A driving force generated by resonance of the piezoelectric actuators is effectively coupled into the light pass crystal, and the light pass crystal resonates to generate stress birefringence changing periodically. Polarized lights are decomposed into components along two direction of the birefringence when passing through the PEM, and a polarization state of emergent lights is modulated with changes of the birefringence. A long bar-shaped PEM [J. C. Kemp. Piezo-Optical Birefringence Modulators: New Use for a Long-Known Effect[J]. Journal of the Optical Society of America, 59 (1969) 950-954] was invented by J. C. Kemp in 1969. A single piezoelectric actuator is connected with a long bar-shaped isotropic light pass crystal. This type of PEM, which generates extremely pure polarization modulation in the length direction, has been well applied in measurement of circular dichroism and polarization spectroscopy. However, the PEM of such a structure has a small light pass area and a small acceptance angle. Besides, the PEM of the structure may also introduce apparent circular polarization modulation. A PEM [U.S. Pat. No. 3,867,014. Symmetric birefringence modulator, Feb. 18, 1975] having a symmetric was designed by J. C. Kemp in 1975, which overcomes advantages of a single-drive long bar-shaped PEM, and the PEM is enabled to have application advantages including a wider spectrum window, a large light pass area, a larger acceptance angle, better vibration resistance, higher modulation purity, higher modulation precision, and better modulation stability and so on, so that a polarized light photoelastic modulation technology is well applied in fields including spectral measurement, polarization imaging, Stokes parametric analysis, ellipsometry parametric measurement, linear birefringence measurement, optical rotation measurement and so on.

However, an existing PEM has limited retardation, and after the PEM is installed, a fast modulation axis has a fixed direction, thus it is necessary to rotate the whole mechanical device of the PEM if it is necessary to change the direction of the fast modulation axis during an application process, thus increasing application difficulty, and application advantages including speediness, high precision, stability, and so on of the PEM cannot be utilized at the same time. As reported by a document [Linear birefringence in CaF2 measured at deep ultraviolet and visible wavelengths, Optical Engineering, 2004, 3(1):115-121], a single PEM is applied to linear birefringence measurement, and a optical system is complicated in design so as to measure a birefringence amplitude and a fast shaft direction at the same time, and thus can be hardly implemented. Static birefringence is introduced into a method for fixing the existing PEM, thereby limiting application of the PEM in the field of high precision and high flexibility measurement. Thus, it is great importance to design a novel PEM structure and develop a PEM with a fast modulation axis direction which can be precisely controlled by a driving controller.

SUMMARY OF THE INVENTION

The present invention provides a novel PEM having a symmetric structure so as to solve the disadvantages in the traditional art. The PEM which controls driving voltages of two groups of piezoelectric actuators, is able to implement polarized light modulation having a relatively large optical path difference, and polarized light modulator having a fast modulation axis moving circumferentially, and the PEM operates stably without a moving component.

The present invention applies the following technical solution so as to solve the technical problem above.

The technical solution, which is the same as the claims, is omitted herein.

Compared with the traditional art, the present invention has the following beneficial effect.

1) The piezoelectric actuators are in soft connection with the photoelastic crystal, and the sectional widths of the piezoelectric actuators are slightly larger than the light pass thickness of the photoelastic crystal, thereby ensuring relatively high coupling efficiency and vibration stability.

2) The supporters are fixed on the vibration wave node positions of the piezoelectric actuators, thereby reducing static birefringence caused by fixation of the supporters on the photoelastic crystal, and avoiding influence caused by the fixation of the supporters on vibration of the photoelastic crystal.

3) When the synchronous driving voltages without a phase difference are applied to the two groups of piezoelectric actuators, polarization modulation with a stable and unchanged fast shaft direction and a relatively large optical path difference can be implemented.

4) When an odd number of times of driving voltages with a phase difference of/2 are applied on the two groups of piezoelectric actuators, polarization modulation with a circumferential motion of the fast modulation axis at the same frequency with the driving voltages can be implemented.

5) Driving voltage amplitudes and phases of the two groups of piezoelectric actuators may be also changed to implement polarization modulation of other special forms.

6) Modulation on polarized lights is implemented by a driving voltage without a moving component, and with good vibration resistance and operation stability.

7) When an even number of times of driving voltages with a phase difference of $\pi/2$ are applied on the two groups of piezoelectric actuators, the PEM is able to implement, modulation with relatively large retardation and a fast modulation axis direction is adjusted precisely by adjusting driving voltage amplitudes of the two groups of piezoelectric actuators.

8) When an odd number of times of driving voltages with a phase difference of $\pi/2$ are applied on the two groups of piezoelectric actuators, and the two groups of piezoelectric actuators have equal retardation amplitudes, the PEM implements modulation with the fast modulation axis moving circumferentially at the same frequency with the driving voltages, and the retardation is a fixed value in direct proportion to driving voltage amplitudes.

BRIEF DESCRIPTION OF THE DRAWINGS

Specific embodiments of the present invention will be further expounded hereinafter through the accompanying drawings.

Figure 1:
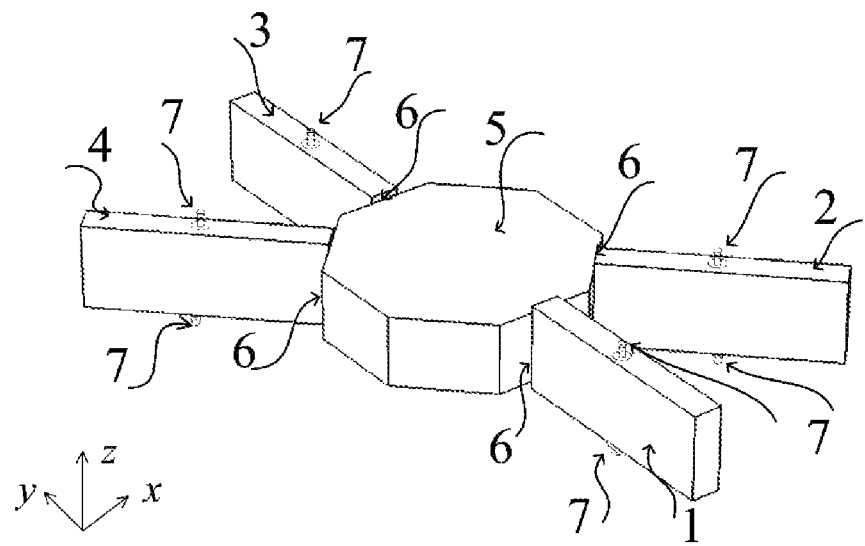
FIG. 1 is a stereogram of a PEM according to the present invention.

In the drawings: 1 is a first piezoelectric actuator, 2 is a second piezoelectric actuator, 3 is a third piezoelectric actuator, 4 is a fourth piezoelectric actuator, 5 is a light pass crystal, 6 is a connection rubber layer, 7 is a plastic supporter, 8 is an electrode layer, 9 is a supporting housing, 10 is a bolt, 11 is a rubber ring, 12 is an electric adapter, 13 is a driver controller driver controller, and 14 is an electric output end.

DETAILED DESCRIPTION OF THE EMBODIMENTS

The present invention will be further described below through the embodiments in combination with the accompanying drawings.

A novel polarized light modulator structure having a symmetric structure based on a photoelastic comprises four piezoelectric actuators, a light pass crystal 5, plastic supporters 7, supporting housings 9 and a driver controller 13. The piezoelectric actuators are made of a crystal having a piezoelectric and a inverse piezoelectric effect, such as a xyt(−18.5°) cut quartz crystal or a zyw(35°) cut lithium niobate crystal, operate in a length extension vibration mode, and select the fundamental frequency modality as an operating modality; two light pass faces of the light pass crystal 5 are designed into parallel regular octagons directly facing each other, and identical rectangles are formed by eight side faces of the light pass crystal 5. The crystal is made of an isotropic crystal having a wide spectrum range and a good temperature stability, such as a fused quartz crystal, a calcium fluoride crystal or a zinc selenide crystal, and also selects the fundamental frequency modality as an operating modality. In four piezoelectric actuators, a first piezoelectric actuator 1 is matched with a third piezoelectric actuator 3 to form a first group and a second piezoelectric actuator 2 is matched with a fourth piezoelectric actuator 4 to form a second group. Each piezoelectric actuator is adhered on a middle position of a rectangular side face of the light pass crystal by high performance silicone rubber. The sectional widths of the piezoelectric actuators are larger than the light pass thickness of the photoelastic crystal 5, the width directions of the piezoelectric actuators are consistent with the direction of the light pass thickness of the light pass crystal, and an included angle between the two groups of piezoelectric actuators in the length direction is 45°. The piezoelectric actuators and the light pass crystal 5 operate in fundamental frequency modalities having the same frequency. According to the material and the size of the crystal, the frequency is 30 kHz to 70 kHz preferably. The plastic supporters 7 are adhered on the wave node positions of vibration of the piezoelectric actuators, and for a precisely cut crystal, i.e. on a central position of the length, the supporting housings 9 fix the plastic supporters 7 of the piezoelectric actuators without affecting other components of the whole modulator. The driver controller 13 is provided with two independent electric output ends. The driver controller can adjust a frequency and an amplitude of an output modulation voltage and may further adjust a phase difference between alternating driving voltages of the two output ends. The two electric output ends input two groups of driving alternating voltages to the piezoelectric actuators respectively, and desired polarization modulation is implemented by adjusting the driving voltages of the two groups of piezoelectric actuators.

The present invention will be described in more details below in combination with the accompanying drawings and embodiments.

Figure 2:
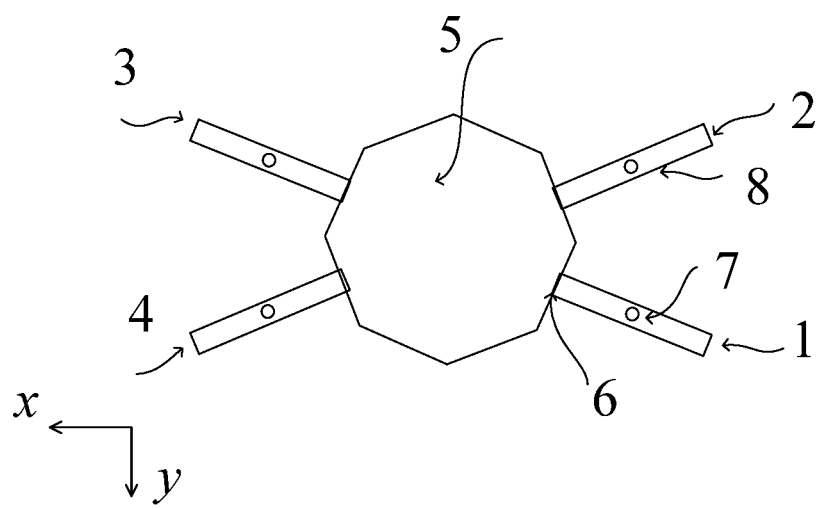
FIG. 2 is a top view of a PEM according to the present invention.

As shown in FIG. 1 and FIG. 2, piezoelectric actuators drive a photoelastic crystal 5 to resonate so as to implement photoelastic modulation of a novel PEM having a symmetric structure. Generally, the piezoelectric actuators select to operate in a length extension vibration mode, and are generally made of a crystal having piezoelectric and inverse piezoelectric effects, including quartz, lithium niobate and so on. A cutting type of a length extension vibration mode of a quartz crystal is xyt(−18.5°), and a cutting type of a length extension vibration mode of a lithium niobate crystal is zyw(35°). A fundamental frequency of length extension vibration of a precisely cut piezoelectric crystal chip roughly satisfies Formula $$f_0 = \frac{1}{2l}\sqrt{\frac{E}{\rho(1-\sigma^2)}},$$

wherein l is the length of the chip, E is the Young's modulus, ρ is the crystal density, and σ is the Poisson's ratio. A good crystal material is selected according to the formula above. A crystal chip having a proper size may be designed and cut in the case that a target frequency is known. For example, when a fundamental frequency of a xyt(−18.5°) cut quartz piezoelectric actuator used frequently at present is 50 kHz, a chip size is generally 51.08 mm×19.18 mm×6.48 mm. A 2 to 3 μm thick gold film is plated as an electrode layer 8 on two wide faces of the cut chip, i.e. on a yoz crystal face of a xyt(−18.5°) cut quartz chip. A lead is welded on the electrode layer 8, a high driving voltage having the same frequency with the fundamental frequency is applied thereon, and vibration displacement signals having the same frequency may be measured on two end faces of the piezoelectric actuators by a vibration meter.

Two light pass faces of the photoelastic crystal 5 are designed into parallel regular octagons directly facing each other in the present invention, and eight side faces of the light pass crystal 5 are symmetric structures of identical rectangles. The photoelastic crystal selects a two-dimensional skeletal vibration mode as an operating mode, and is generally made by an isotropic material having a relatively wide spectrum range, such as fused quartz, calcium fluoride and a zinc selenide, and has a fundamental frequency roughly satisfying $$f_0 = \frac{1}{2l}\sqrt{\frac{E}{\rho(1+\sigma)}},$$

wherein l is the distance between two side faces directly facing each other of the crystal, E is the Young's modulus, ρ is the crystal density, and σ is the Poisson's ratio. For example, if the photoelastic crystal is fused quartz, the distance between the two side faces directly facing each other of the crystal is set as 54.80 mm and the light pass thickness is set as 16 mm so that the fundamental frequency is 50 kHz. As shown in FIG. 1, the first piezoelectric actuator 1 and the third piezoelectric actuator 3 are matched to form a first group, and the second piezoelectric actuator 2 and piezoelectric actuator the fourth 4 are matched to form a second group. The two groups of piezoelectric actuators are in soft connection with the photoelastic crystal 5 by high performance silicone rubber. The thickness of a connection rubber layer 6 is 0.2 to 0.5 mm. The four piezoelectric actuators are adhered on middle positions of side faces of the photoelastic crystal 5, and an included angle between the two groups of adhered piezoelectric actuators is 45° in the length direction. The four piezoelectric actuators are designed with consistent fundamental frequencies which are the same as the fundamental frequency of the photoelastic crystal, and the sectional widths of the piezoelectric actuators are larger than the light pass thickness of the photoelastic crystal 5, thereby ensuring that length extension vibration of the piezoelectric actuators can be effectively coupled into the photoelastic crystal 5 and ensuring vibration stability.

Figure 3:
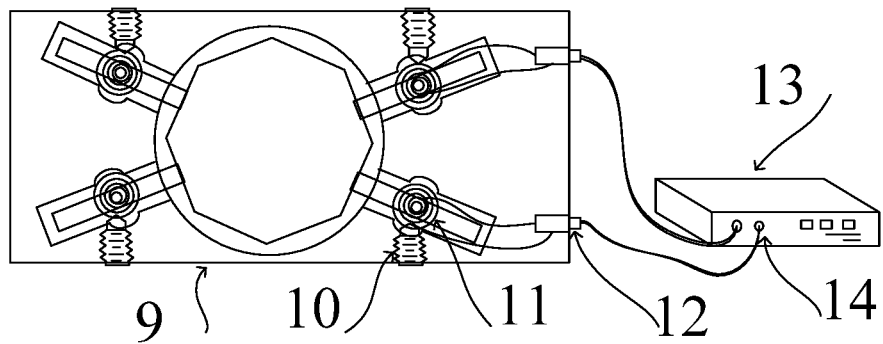
FIG. 3 is a connection view according to the present invention.
Figure 4:
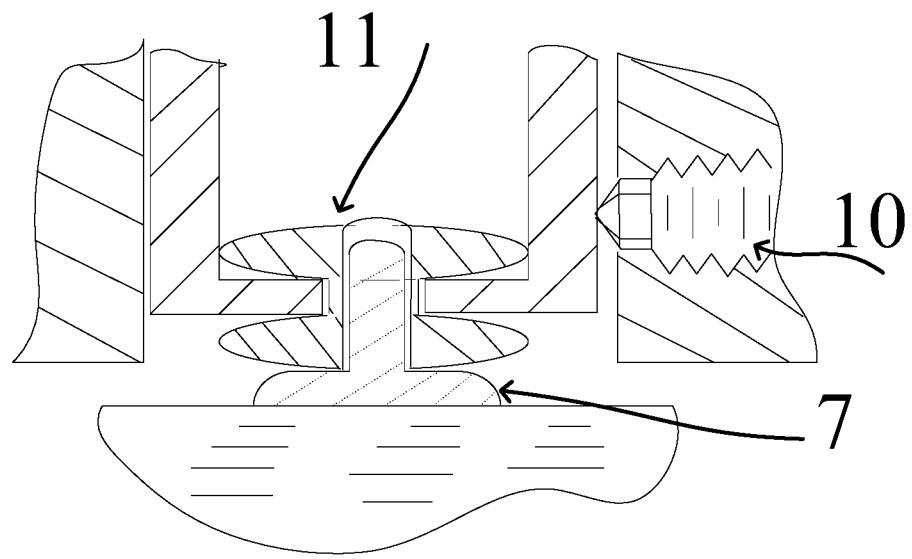
FIG. 4 is a sectional view of a plastic supporter nested and fixed by a rubber ring in a supporting housing.

As shown in FIG. 3 and FIG. 4, plastic supporters 7 are respectively adhered on vibration wave node positions of the four piezoelectric actuators, rubber rings 11 are designed in order to nest the plastic supporters 7, and the rubber rings 11 are fixed in supporting housings 9 by bolts 10 so as to fix and support the PEM of the present invention. Electrode faces of the two groups of piezoelectric actuators are respectively connected to two Bayonet Nut Connector (BNC) electric adapters 12 on the right sides of the supporting housings 9. A driver controller 13 outputs an alternating driving voltage signal having the same frequency as the fundamental frequency to the two groups of piezoelectric actuators respectively. Two electric output ends 14 of the driver controller 13 correspond to a resonance amplifier circuit respectively inside the driver controller 13. A resonance point frequency of the resonance amplifier circuits is the same as a fundamental frequency of length extension vibration of the piezoelectric actuators, and the driver controller 13 can adjust amplitudes and phases of the output driving voltages. The piezoelectric actuators resonate under the action of the driving voltages to generate a periodical stress which is coupled into the photoelastic crystal 5 so as to enable the same to resonate. At each moment, particles in the photoelastic crystal receive the action of the two groups of piezoelectric actuators simultaneously, and vibration of the particles is synthesized by separate vibration caused by two drivers.

A novel structure 45° double-drive PEM includes four piezoelectric actuators, wherein two piezoelectric actuators in the direction of the same straight line form a group, and an included angle of straight lines where the two groups of piezoelectric actuators locate is 45°; a light pass crystal 5; plastic supporters 7; supporting housings 9 and a driver controller 13. The piezoelectric actuators are made of a crystal having piezoelectric and inverse piezoelectric effects, such as a xyt(−18.5) cut quartz crystal and a zyw(35) cut lithium niobate crystal, operate in a length extension vibration mode, and select a fundamental frequency modality as an operating modality. The light pass crystal 5 is a regular octagonal sheet and is made of an isotropic crystal having a wide spectrum range and good temperature stability, such as a fused quartz crystal, a calcium fluoride crystal or a zinc selenide crystal, and also selects a fundamental frequency modality as an operating modality. In four piezoelectric actuators, a first piezoelectric actuator 1 is matched with a third piezoelectric actuator 3 to form a first group and a second piezoelectric actuator 2 is matched with a fourth piezoelectric actuator 4 to form a second group. Each piezoelectric actuator is adhered on a middle position of a rectangular side face of the light pass crystal by high performance silicone rubber. The sectional widths of the piezoelectric actuators are larger than the light pass thickness of the photoelastic crystal 5. An included angle between the two groups of piezoelectric actuators in the length direction is 45. The piezoelectric actuators and the light pass crystal 5 operate in fundamental frequency modalities having the same frequency. According to the material and the size of the crystal, the frequency is 30 kHz to 70 kHz preferably. The plastic supporters 7 are adhered on the wave node positions of vibration of the piezoelectric actuators, and on a central position of a precisely cut crystal in the length. The supporting housings 9 fix the plastic supporters 7 of the piezoelectric actuators without affecting other components of the whole modulator. The driver controller 13 is provided with two alternating voltage output ends. Frequencies and amplitudes of the output alternating voltages may be adjusted. Besides, a phase different between the alternating driving voltages of the two output ends may be also adjusted. The two electric output ends input two groups of driving alternating voltages to the piezoelectric actuators respectively, and the driving voltages of the two groups piezoelectric actuators are adjusted to adjust different modulation states of the PEM.

The photoelastic crystal 5 is designed into a regular octagonal sheet in the present invention, and eight side faces of the regular octagons are symmetric structures of identical rectangles. The photoelastic crystal selects a two-dimensional skeletal vibration mode as an operating mode, and is generally made by an isotropic material having a relatively wide spectrum range, such as fused quartz, calcium fluoride and a zinc selenide, and has a fundamental frequency roughly satisfying $$f_0 = \frac{1}{2l}\sqrt{\frac{E}{\rho(1+\sigma)}},$$

wherein l is the distance between two side faces directly facing each other of the crystal, E is the Young's modulus, ρ is the crystal density, and σ is the Poisson's ratio. For example, if the photoelastic crystal is fused quartz, the lengths of sides of the regular octagons are 22.70 mm and the light pass thickness is 16 mm so that the fundamental frequency is 50 kHz. As shown in FIG. 1, the first piezoelectric actuator 1 and the third piezoelectric actuator 3 are matched to form a first group, and the second piezoelectric actuator 2 and the fourth piezoelectric actuator 4 are matched to form a second group. The two groups of piezoelectric actuators are in soft connection with the photoelastic crystal 5 by high performance silicone rubber. The thickness of a connection rubber layer 6 is 0.2 to 0.5 mm. The four piezoelectric actuators are adhered on middle positions of side faces of the photoelastic crystal 5, and an included angle between the two groups of adhered piezoelectric actuators is 45 in the length direction. The four piezoelectric actuators are designed with consistent fundamental frequencies which are the same as the fundamental frequency of the photoelastic crystal, and the sectional widths of the piezoelectric actuators are larger than the light pass thickness of the photoelastic crystal 5, thereby ensuring that length extension vibration of the piezoelectric actuators can be effectively coupled into the photoelastic crystal 5 and ensuring vibration stability.

(1) When synchronous alternating driving voltages without a phase difference and having the same amplitude are applied to the two groups of piezoelectric actuators, polarization modulation with a stable and unchanged fast shaft direction and a relatively long optical path may be implemented along the direction of a y axis.

(2) When an odd number of times of driving voltages having a phase difference of π/2 and the same amplitude are applied to the two groups of piezoelectric actuators, polarization modulation with the fast modulation axis having moving circumferentially in the same frequency with the driving voltages may be implemented, and the retardation is a fixed value in direct proportion to driving voltage amplitudes.

(3) This type of PEM having the symmetric structure may also change driving voltage amplitudes and phases of the two groups of piezoelectric actuators to implement polarization modulation of other special forms.

(4) When an even number of times of driving voltages with a phase difference of π/2 are applied on the two groups of piezoelectric actuators, modulation with relatively large retardation may be implemented and the fast modulation axis direction is adjusted precisely by adjusting driving voltage amplitudes of the two groups of piezoelectric actuators.

The accompanying drawings and embodiments illustrated herein are only used for describing the technical solution of the present invention, but are not limitation thereto. Although the present invention has been described in a relatively detailed manner with reference to preferred embodiments, those skilled in the art should understand that specific implementation methods of the present invention may be still modified, or some technical features may be replaced equivalently without departing from the spirit of the present invention, and the modifications and replacements should be covered within the scope of the technical solution claimed to be protected by the present invention.

The invention claimed is:

1. A novel Photoelastic Modulator (PEM) having a symmetric structure, wherein it comprises;
   a piezoelectric actuator,
   a light pass crystal and a driver controller-;
   two light pass faces of the light pass crystal are parallel regular octagons directly facing each other, and identical rectangles are formed by side faces of the light pass crystal;
   the piezoelectric actuator is in soft connection with middle positions of the rectangles by a connection rubber layer;
   the width directions of the piezoelectric actuator is consistent with the direction of the light pass thickness of the light pass crystal, and the widths are slightly larger than the light pass thickness;
   the piezoelectric actuator is connected with a electric output end on the driver controller by an electric adapter;
   a plastic supporter provided on the piezoelectric actuator;
   the plastic supporter is adhered on wave node positions of vibration of the piezoelectric actuator;
   for a central position of a precisely cut crystal in the length, the supporter is nested in a rubber ring and the rubber ring is fixed on a supporting housing by a bolt; and
   an electrode layer is plated on two sides of the piezoelectric actuator, and the electrode layer is connected with the electric adapter of two Bayonet Nut Connector (BNC) interfaces at the right sides of the supporting housing.

2. A novel PEM having a symmetric structure according to claim 1, wherein the piezoelectric actuator is made of a crystal having a piezoelectric and a inverse piezoelectric effect, operate in a length extension vibration mode, and select a fundamental frequency modality as an operating modality;
   the light pass crystal is made of an isotropic crystal having a wide spectrum range and a good temperature stability, selects a fundamental frequency modality as an operating modality;
   the piezoelectric actuator and the light pass crystal operate in fundamental frequency modalities having the same frequency.

3. A novel PEM having a symmetric structure according to claim 2, wherein the piezoelectric actuator is made of a xyt(−18.5°) cut quartz crystal or a zyw(35°) cut lithium niobate crystal.

4. A novel PEM having a symmetric structure according to claim 2, wherein the light pass crystal (5) is made of a fused quartz crystal, a calcium fluoride crystal or a zinc selenide crystal.

5. A novel PEM having a symmetric structure according to claim 2, wherein the frequency is 30 kHz to 70 kHz.

6. A novel PEM having a symmetric structure according to claim 1, wherein two resonance amplifier circuits are provided in the driver controller;
   the resonance amplifier circuits are connected with electric output ends respectively; a resonance point frequency of the resonance amplifier circuits is the same as a fundamental frequency of length extension vibration of the piezoelectric actuator;
   the driver controller inputs an alternating voltage into the piezoelectric actuator via the electric output end (14).

7. A novel PEM having a symmetric structure according to claim 1, wherein the connection rubber layer is a high performance rubber.

8. A novel PEM having a symmetric structure according to claim 1, wherein there are four piezoelectric actuators, which are a first piezoelectric actuator, a second piezoelectric actuator, a third piezoelectric actuator and a fourth piezoelectric actuator respectively;
   the first piezoelectric actuator is matched with the third piezoelectric actuator to form a first group;
   the second piezoelectric actuator is matched with the fourth piezoelectric actuator to form a second group; and
   an included angle between the two groups of piezoelectric actuators in the length direction is 45°.

9. A novel PEM having a symmetric structure according to claim 8, wherein when an even number of times of driving voltages with a phase difference of π/2 are applied on the two groups of piezoelectric actuators, the PEM can implement, modulation with relatively large retardation, and the fast modulation axis direction is adjusted precisely by adjusting driving voltage amplitudes of the two groups of piezoelectric actuators.

10. A novel PEM having a symmetric structure according to claim 8, wherein when an odd number of times of driving voltages with a phase difference of π/2 are applied on the two groups of piezoelectric actuators, and the two groups of piezoelectric actuators have equal retardation amplitudes, the PEM implements modulation with a fast shaft moving circumferentially at the same frequency with the driving voltages, and the retardation is a fixed value in direct proportion to driving voltage amplitudes.

11. A 45° double-drive PEM, comprising:
a piezoelectric actuator, a light pass crystal and a driver controller;
the light pass crystal is a symmetric structure of a regular octagonal sheet;
the piezoelectric actuator is in soft connection with the middle positions of side faces of the light pass crystal via a connection rubber layer;
the width of the piezoelectric actuator is slightly larger than the light pass thickness;
the piezoelectric actuator is connected with a electric output end on a driver controller through an electric adapter;
a plastic supporter is provided on the piezoelectric actuator;
the plastic supporter is adhered on wave node positions of vibration of the piezoelectric actuator;
for a central position of a precisely cut crystal in the length, the supporter is nested in a rubber ring and the rubber ring is fixed on a supporting housing by a bolt; and
an electrode layer is plated on two sides of the piezoelectric actuator, and the electrode layer is connected with the electric adapter of two Bayonet Nut Connector (BNC) interfaces at the right sides of the supporting housing.

* * * * *